United States Patent
Brinkmann et al.

[11] 3,944,432
[45] Mar. 16, 1976

[54] STORAGE BATTERY PLATE AND MANUFACTURING PROCESS THEREFOR

[75] Inventors: Jurgen Brinkmann; Manfred Rasche, both of Hagen; Willi Heissmann, Nachrodt, all of Germany

[73] Assignee: Varta Batterie Aktiengesellschaft, Hannover, Germany

[22] Filed: Jan. 29, 1974

[21] Appl. No.: 437,703

[30] Foreign Application Priority Data
Feb. 3, 1973  Germany............................ 2305309

[52] U.S. Cl..................................... 136/63; 136/65
[51] Int. Cl.² ......................................... H01M 35/04
[58] Field of Search ............. 136/53, 62, 36, 38, 44, 136/52-55, 26, 65

[56] References Cited
UNITED STATES PATENTS

| | | | |
|---|---|---|---|
| 1,370,013 | 3/1921 | Ford | 136/63 |
| 2,615,061 | 10/1952 | Brandt | 136/36 |
| 2,647,157 | 7/1953 | Booth | 136/147 |
| 3,813,300 | 5/1974 | Shima et al. | 136/38 |

*Primary Examiner*—Anthony Skapars
*Attorney, Agent, or Firm*—Weiser, Stapler & Spivak

[57] ABSTRACT

A storage battery plate has lead bars positioned within channels defined by a grid of plastic strips. These channels also contain the active mass. The channels are closed off by electrolyte permeable cover layers.

12 Claims, 8 Drawing Figures

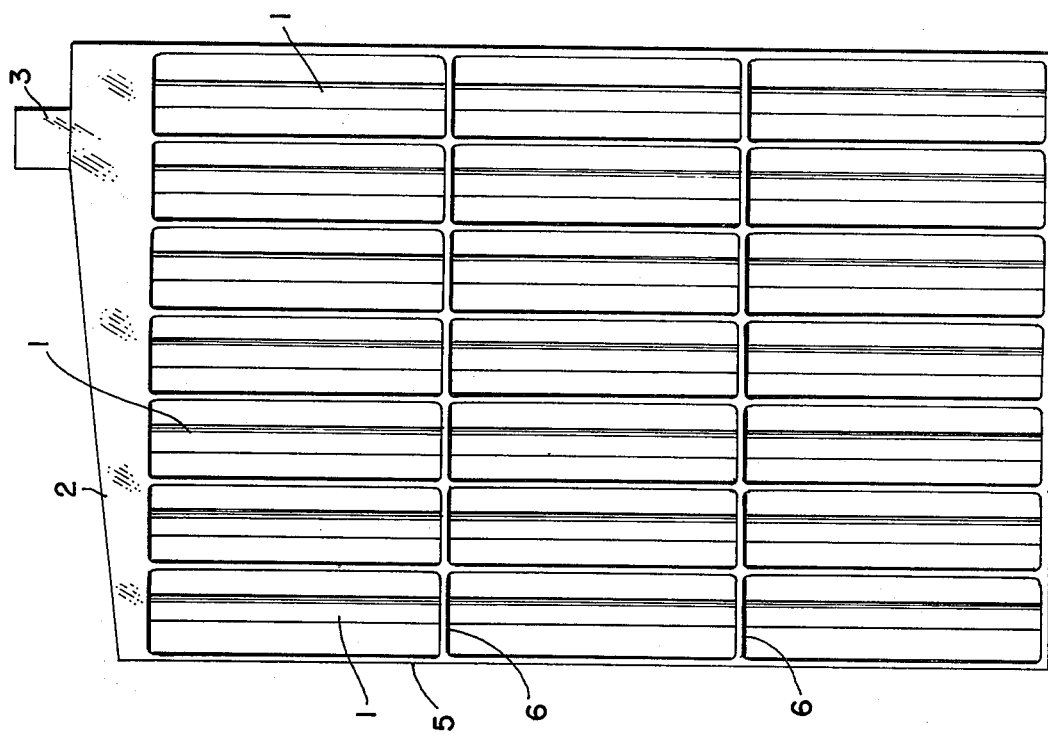
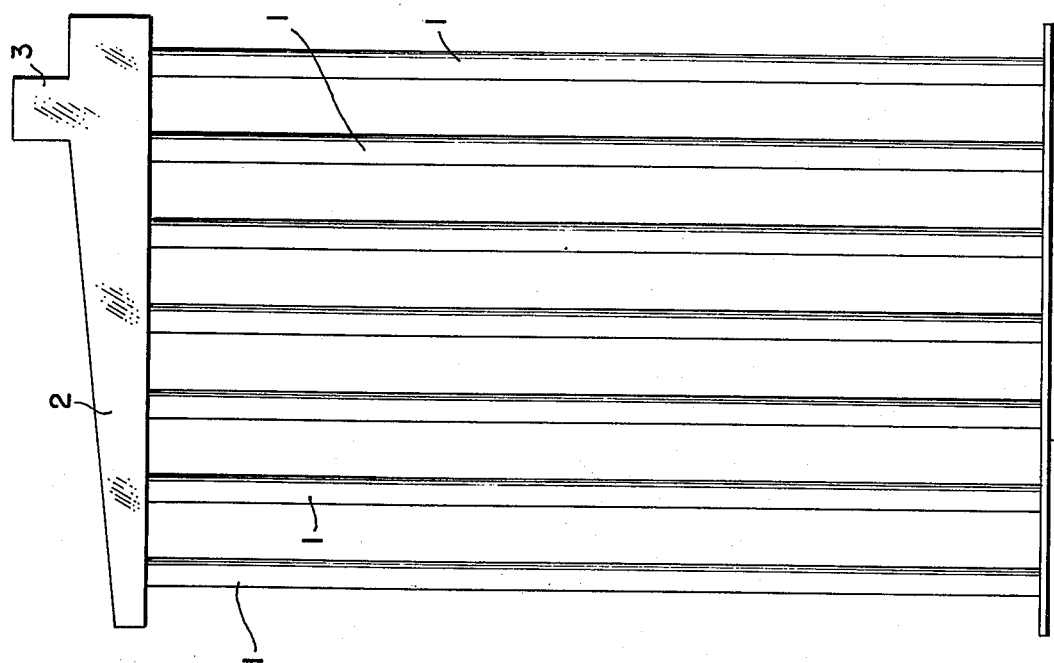

STORAGE BATTERY PLATE AND MANUFACTURING PROCESS THEREFOR

The invention relates to a storage battery plate having a grid of parallel lead bars positioned centrally within channels formed by the bars of a plastic grid and containing the active mass.

So-called grid plates in lead storage batteries are known. Such a plate consists of a lead grid, whose purpose it is to carry the active mass, which is necessary for the energy transformation, and also to conduct the electrical current from the active mass to the electrical contacts. Because of the volume expansion of the active mass during transformation from $PbO_2$ to $PbSO_4$, or from $Pb$ to $PbSO_4$ during charging and discharging, portions of active mass may become detached from the plates during the service life. This limits particularly the service life of the positive plate of a lead storage battery.

Also known are so-called iron-clad plates. In these, the active mass is contained in tubes of small diameter, with walls permeable to acid diffusion. Lead cores are positioned centrally within these tubes and the space between core and surrounding tube wall is filled with the active mass.

There, the main function of the lead core is to conduct the current out of the active mass. The surrounding tube protects the active mass from crumbling away. This plate construction permits a very good utilization of the active mass, since it need not be mechanically bound together during manufacture, the tube serving this function. Consequently, the active mass can be optimized for best utilization. Furthermore, such cladding of the active mass by the surrounding tube walls, which substantially reduces the crumbling away, considerably extends the service life.

The tubes consist either of slit hard rubber, of glass-fiber batting surrounded by a perforated plastic coating or of a web made of glass, of plastic, or of a mixture of the two.

A drawback of this tubular structure is that the active mass has to be inserted into the small space between the lead core and the tubular wall. This requires a time-consuming shaking operation. Mass production of such tubular plates, therefore requires a major investment.

It has been attempted to reduce the crumbling away of the active mass in conventional grid plates by covering the active mass of the positive grid with a web or batting before insertion into the cell casing. However, this is not conducive to long service life for the positive tubular plates. Another drawback is that the active mass to be introduced into the grids must be so firmly bound together that none of it falls out of the grid during manufacture. This requires that the active mass (paste) have a consistency which precludes optimum mass utilization.

It has further been proposed to equip the grids of storage battery plates with lead conductors for the current and with a honeycomb structure for holding the active mass. In this embodiment the honeycomb structure is made of plastic. However, this plate construction has the disadvantage that the honeycomb structure takes up so much of the plate volume, that much of the room for active mass is lost. The achievable energy density ($Wh/cm^3$) of such a plate, is therefore low.

Another disadvantage is, that the honeycomb plate can be filled only with a paste-like active mass, whose consistency permits only comparatively low utilization for the transformation of energy. Also the holding of the active mass by the honeycomb structure has not proved to be effective enough, to provide as long a service life as a tubular plate.

It is an object of the invention to overcome these drawbacks of known storage battery plates and to provide a plate, capable of superior mass utilization and long service life, as well as to provide a process for the convenient manufacture of such plates.

This object is achieved, according to the invention, by covering the accumulator plate on both sides with electrolyte permeable mats. These mats are firmly attached to plastic transverse connectors and to plastic strips. These connectors and strips form long and narrow channels, containing the active mass in powder form.

According to the invention, the plate comprises a grid having lead bars arranged in parallel and connected to each other at one or both ends by lead straps. Centered between adjacent lead bars there extend strips of acid-resistant plastic, of the least possible thickness, and of a width corresponding to the ultimate thickness of the finished plate. These plastic strips are interconnected by various cross-connections also of acid-resistant plastic. These plastic cross-connections so enclose the respective lead bars that the latter are centrally positioned within the channels formed by the plastic members. The lengths of the cross-connections are related to those of the strips in the ratio of from about 1 : 4 to 1 : 25, and preferably from 1 : 5 to 1 : 12.

The plastic strips and cross-connections are made of material, which can be cast or sprayed, and readily welded or glued, for such as polyvinyl-chloride, polyethylene, poly-styrol, or poly-propylene.

In the manufacture of such plates, a thin mat of glass, or plastic fibers, or of a mixture of the two is first welded or glued to the plastic strips and cross-connections on one side of the grid. The mat can also be formed of a layer of regularly arranged fibers held in place by a few transverse fibers, or of a batting of glass or plastic fibers. Also the kind of separator known in the storage battery art can be used as the mat.

After the mat has been glued or welded to the plastic strips and cross-connections, one side of the grid is closed off.

It is then a simple matter to fill it with active mass through its open side. The active mass used for this purpose can be designed for optimum mass utilization. After the filling operation and during the further manufacturing process no mechanical retention means is necessary, because the active mass is retained in the three-sided channels formed by the strips of the grids, and the mat welded or glued to them. Therefore, even red lead oxide can be used as active mass, which is well known to have a high mass utilization coefficient.

After the filling operation is completed, a mat of the above-described material is welded or glued in the same manner as previously described to the plastic strips and cross-connections on the open side of the plate. Thus, a plate is produced, which is mechanically closed on both sides by a mat permeable to the acid diffusion. On the other hand, this plate prevents crumbling away of the active mass during operation of the battery, thereby securing long service life. Likewise, it allows the use of an active mass having a high utilization coefficient. Moreover, it can be made by mechanized and even automated manufacturing techniques.

After glueing or welding of the second mat, the plate can be pressed or rolled to the desired thickness, with brief heating of the plate strips and cross-connections if required. Thus, any desired density, specific weight, and pore volume can be obtained.

For further details reference may be had to the description which follows in the light of the accompanying drawings, wherein:

FIG. 1 shows the basic configuration of a plate grid;

FIG. 2 shows the grid of FIG. 1 with plastic members in place;

The same reference numerals refer to similar elements in the various figures.

Figure 3:
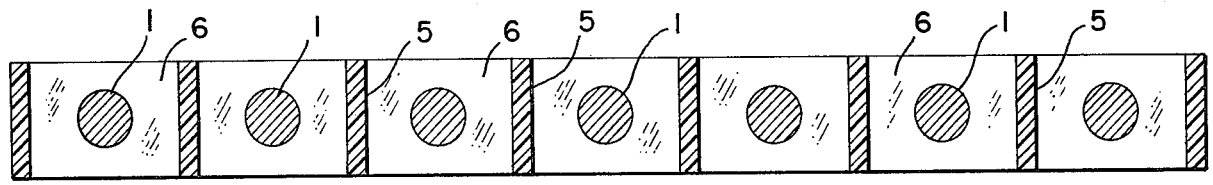
FIGS. 3 through 6 show cross-sections of an embodiment of the invention, at various steps in its process of manufacture.

FIG. 1 shows the lead bars 1 of the grid and a lead strap 2, connecting the bars mechanically and electrically. Plates of the same polarity can be connected in parallel via terminal lug 3, by welding to a common pole bridge (not shown), during assembly in the cells. By means of a second strap 4 the other head ends of the lead bars can also be welded together. This second strap 4 preferably has smaller cross-section, because it has to conduct only low current, when the plates are asymmetrical. Strap 2 preferably has increasing cross-section toward lug 3.

FIG. 2 shows the same grid with lead bars 1 and straps 2 and 4, to which the plastic strips 5 and cross-connections 6 have been applied by injection molding. It is desirable to spray lead straps 2 and 4 with a thin plastic coating. This insulates them electrically from their surroundings in the final cell assembly, and prevents corrosion and short-circuits between plates of different polarity. Strap 4 may also be made of plastic during the spraying operation, rather than of lead during casting of the grid. This saves weight, while providing equal or even greater strength.

FIG. 3 shows a cross-section through the grid with the plastic strips and cross-connections, at right angles to the lead bars which conduct the current. The plastic strips shown in cross-section are again designated 5, the plastic cross-connections are designated 6. The lead conductor 1 is positioned by the surrounding plastic cross-connection in the center of the channel which is formed by two adjacent plastic strips.

Figure 4:
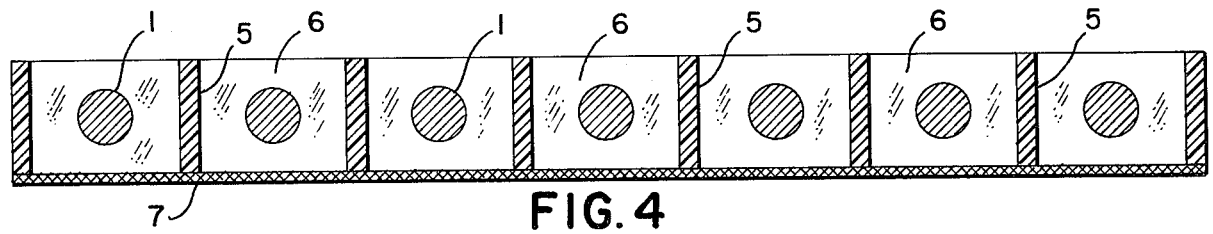

FIG. 4 shows the mat 7, closing off the plate on one side after being welded or glued in place. The mat consists of a glass fiber or plastic web, of glass wool or plastic batting, or of a conventional porous separator material.

Figure 5:
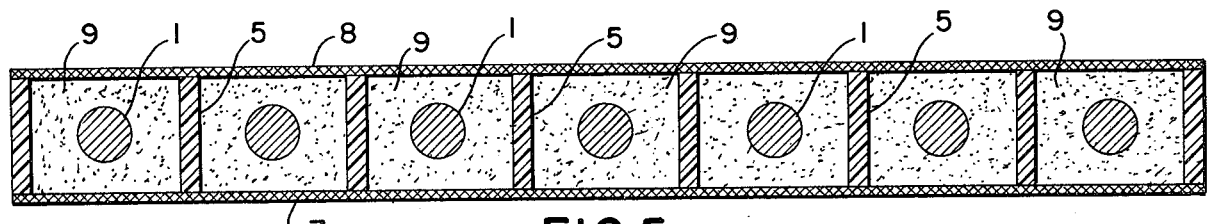

FIG. 5 shows the same cross-section through the plate, but after having been filled with active mass 9 and after the second mat 8 has been welded or glued in place.

Figure 6:
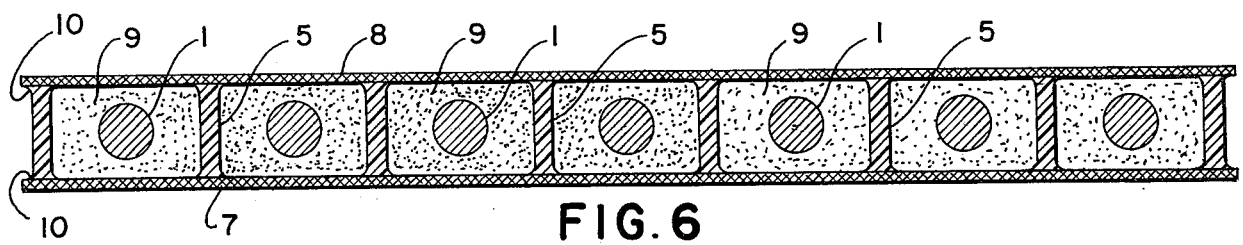

FIG. 6 shows the compression of plastic strips 5 after the plate filled with active mass and with second mat 8 in place has been pressed to a predetermined thickness in a press or between a pair of rollers.

If the heat needed for plastic deforming is applied evenly through both mats to plastic strip 5 and cross-connections 6, compression broadens strips 5 and cross-connections 6 at points 10, at which they meet mats 7 and 8. Thus active mass 9 is clamped even more firmly in the plate.

While surrounding of lead bars 1 and straps 2 and 4 with plastic cross-connections 6 can be carried out by any known method, it is preferred to use so-called mirror-welding for attaching mats 7 and 8 to plastic strips 5 and cross-connections 6. This involves heating the points of strips 5 and cross-connections 6 which are to be welded by means of heating plates or rollers until they reach a pasty consistency. Mats 7 and 8 are then immediately applied and pressed down. The fibers of the mats weld or glue together with the paste-like material of the plastic strips and cross-connections and so become firmly attached.

If straight gluing is used, glue is applied to the appropriate spots on plastic strips and cross-connections by means of an applicator roller, and the mats are then applied and pressed into place.

Subsequent compression has the advantage that the plates need not be filled with active mass all the way up to the upper edge of the plastic strips.

Figure 7:
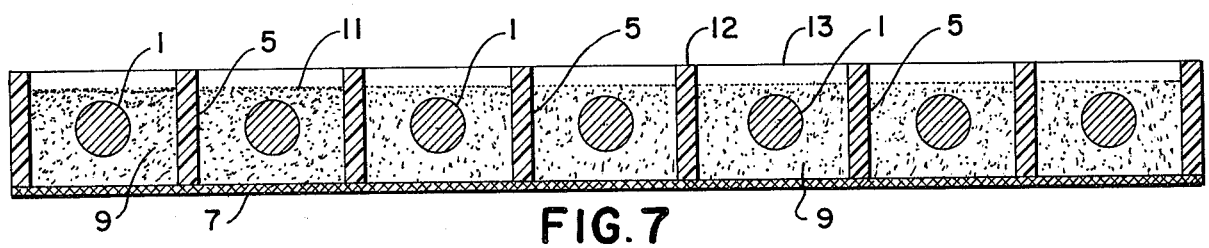
FIG. 7 shows a cross-section of another embodiment.

FIG. 7 shows a plate, filled in this manner, in which the active mass 9 stops at line 11. This makes it cconvenient to clean plastic strips 5 and cross-connections 6 before the welding or gluing operation at spots 12 and 13 at which these operations are to be performed. It also eliminates the danger that the heating plates or rollers or the applicator rollers might contact the active mass. During subsequent compression the plastic strips 5 and cross-connections 6 are compressed to whatever degree is necessary to achieve the desired density of the active mass.

Porous plastic may be used instead of solid, and plastic strips 5 and cross-connections 6 may be produced by foam-spraying. The resulting open-pore foam can serve as a reservoir for the electrolyte and also provide for electrolyte diffusion.

Figure 8:
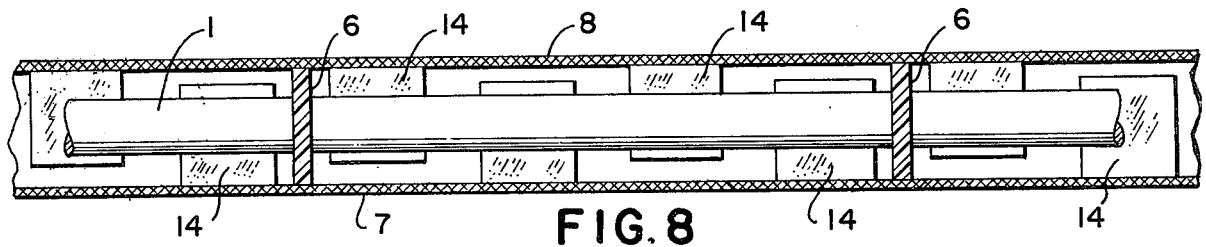
FIG. 8 shows a cross-section of still another embodiment.

The same result can be achieved as shown in FIG. 8 by using alternate interrupted plastic strips 14, instead of the continuous plastic strips 5.

FIG. 8 shows such an arrangement in cross-section taken through the plastic cross-connections 6.

During assembly of plates of different polarity into plate-pairs, an additional separator in front of the mats can be omitted, since these mats act also as separator, in addition to their function in holding the active mass. The spacing between the plates of different polarity is maintained by conventional means.

It is an advantage of a plate embodying the invention, that it can store high energy density, that crumbling away of the active mass is reliably prevented, and that rapid, fully automated manufacturing processes can be used. The plate and process embodying the invention also make it possible to omit the time-consuming shaking operation, which is necessary for the conventional tubular electrode.

We claim:

1. A storage battery plate comprising:
   a grid formed of plastic strips and plastic cross-connections between said strips, said strips defining channels for containing the active mass;
   a grid of lead bars recessed within said channels;
   active mass substantially filling said channels and surrounding said recessed lead bars, said active mass being positioned to leave edges of said plastic strips and cross-connections exposed; and
   electrolyte permeable fibrous mats covering said grid on both sides said mats being firmly attached to said exposed edges of plastic strips and plastic cross-connections.

2. The plate of claim 1, wherein the lengths of the plastic cross-connections are related to the lengths of the plastic strips in the ratio of from about 1 : 4 to about 1 : 25.

3. The plate of claim 1, wherein the plastic strips and cross-connections are thickened at their edges atttached to the fibrous mats.

4. The plate of claim 1, wherein the fibrous mats consist of batting.

5. The plate of claim 1, wherein the fibrous mats are welded to said edges.

6. The plate of claim 1, wherein the plastic strips and cross-connections consist of a coarse pored foam material.

7. The plate of claim 1, wherein the plastic strips are formed of interdigitated segments extending into the mass alternately from opposite surfaces of said mass.

8. The plate of claim 1, wherein the lead bars are substantially centered within said channels and surrounded on all sides by said active mass.

9. A storage battery plate assembly comprising:
a plurality of grids formed of plastic strips and plastic cross-connections between said strips, said strips defining channels for containing the active mass;
a plurality of grids of lead bars, each said grid being recessed within the channels defined by one of said plastic grids;
active mass substantially filling said channels and surrounding said recessed lead bars, said active mass being positioned to leave edges of said plastic strips and cross-connections exposed; and
electrolyte permeable fibrous mats covering each said grid on both sides and firmly attached to said exposed edges of plastic strips and plastic cross-connections, different ones of said grids being placed adjacent each other to form the plates of said assembly, without intervening separator.

10. The assembly of claim 9, wherein said mats form the separators between adjacent plates of said assembly.

11. The assembly of claim 10, wherein adjacent ones of said plates are of different polarity.

12. A storage battery plate comprising:
a grid formed of plastic strips and plastic cross-connections between said strips, said strips defining channels for containing the active mass;
a grid of lead bars recessed within said channels;
active mass substantially filling said channels and surrounding said recessed lead bars, said active mass being positioned to leave edges of said plastic strips and cross-connections exposed; and
electrolyte permeable mats formed of porous separator material covering said grid on both sides
said mats being firmly attached to said exposed edges of platic strips and plastic cross-connections.

* * * * *